United States Patent
Weiand et al.

(10) Patent No.: US 10,364,306 B2
(45) Date of Patent: Jul. 30, 2019

(54) LOW DENSITY POLYETHYLENE WITH HIGH ELONGATION HARDENING

(71) Applicant: Basell Polyolefine GmbH, Wesseling (DE)

(72) Inventors: Sebastian Weiand, Köln (DE); Andrei Gonioukh, Erftstadt (DE); Stephan Schmitz, Köln (DE); Andre-Armand Finette, Köln (DE); Guido Bürger, Brühl (DE); Guido Küpper, Mechernich (DE); Thomas Herrmann, Köln (DE); Iakovos Vittorias, Mainz (DE); Dieter Lilge, Limburgerhof (DE); Gerd Mannebach, Münstermaifeld (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/514,788

(22) PCT Filed: Sep. 9, 2015

(86) PCT No.: PCT/EP2015/070530
§ 371 (c)(1),
(2) Date: Mar. 27, 2017

(87) PCT Pub. No.: WO2016/050462
PCT Pub. Date: Apr. 7, 2016

(65) Prior Publication Data
US 2017/0218103 A1 Aug. 3, 2017

(30) Foreign Application Priority Data

Oct. 1, 2014 (EP) .................................... 14187337

(51) Int. Cl.
| | | |
|---|---|---|
| *C08L 23/06* | (2006.01) |
| *C08F 210/02* | (2006.01) |
| *B05D 1/26* | (2006.01) |
| *B32B 27/32* | (2006.01) |
| *B32B 27/10* | (2006.01) |
| *B32B 27/30* | (2006.01) |
| *C09D 123/08* | (2006.01) |

(52) U.S. Cl.
CPC ............ *C08F 210/02* (2013.01); *B05D 1/265* (2013.01); *B32B 27/10* (2013.01); *B32B 27/306* (2013.01); *B32B 27/308* (2013.01); *B32B 27/32* (2013.01); *C09D 123/08* (2013.01); *B32B 2270/00* (2013.01); *B32B 2307/72* (2013.01); *C08F 2500/08* (2013.01)

(58) Field of Classification Search
CPC ........... C08F 2500/08; C08L 2207/066; C08L 23/06; C08L 2207/07; C09D 123/06
See application file for complete search history.

(56) References Cited

U.S. PATENT DOCUMENTS

| 2,153,553 A | 4/1939 | Fawcett et al. |
| 2011/0172322 A1 | 7/2011 | Michel et al. |
| 2014/0316094 A1* | 10/2014 | Berbee ................. C09D 123/06 526/329 |

FOREIGN PATENT DOCUMENTS

| GB | 934444 A | 8/1963 |
| SU | 472945 A1 | 6/1975 |

OTHER PUBLICATIONS

Kim et al Molecular weight distribution in low-density polyethylene polymerization; impact of scission mechanisms in the case of a tubular reactor, Chemical Engineering Science 59 (2004) 2039-2052, Sep. 2004.*
Encyclopedia of Polymer Science and Technology. Copyright John Wiley & Sons, Inc., vol. 2, pp. 412-441, published on Sep. 2001.*
Wagner et al the strain-hardening behavior of linear and long-chain-branched polyolefin melts in extensional flows, Rheol Acta (2000) 39: 97-109, published in Jan. 2000.*
Stadler et al Influence of molar mass distribution and long-chain branching on strain hardening of low density polyethylene, Rheol Acta (2009) 48:479-490, Published online: Dec. 10, 2008.*
Florian J. Stadler et al, Influence of Molar Mass Distribution . . . , Rheologica Acta, Springer-Verlad, DE, Dec. 10, 2008, pp. 479-490, vol. 48, No. 5, XP019712991, ISSN: 1435-1528.
PCT International Search Report & Written Opinion dated Nov. 30, 2015 for PCT/EP2015/070530.

* cited by examiner

*Primary Examiner* — Gregory Listvoyb

(57) ABSTRACT

The present disclosure provides a low density polyethylene (LDPE) having (A) a density from 0.910 to 0.924 g/cm³, determined according to ISO 1183 at 23° C.; (B) an elongational hardening of at least 4.2, at 150° C. at an elongational rate of 1 s⁻¹; (C) a ratio Mw/Mn of at least 18, where (i) Mw is the weight average molar mass, measured by a MALLS detector coupled to a GPC, and (ii) Mn is the number average molar mass, measured by GPC (Gel Permeation Chromatography); and (D) a Mw of at least 230,000 g/mol. The present disclosure also provides an article of manufacture made from or containing (A) a substrate and (B) a coating layer made from or containing the disclosed LDPE. The present disclosure further provides a polymerization process occurring (A) in the presence of oxygen as the only radical initiating agent and (B) in the absence of solvents.

10 Claims, No Drawings

LOW DENSITY POLYETHYLENE WITH HIGH ELONGATION HARDENING

This application is the U.S. National Phase of PCT International Application PCT/EP2015/070530, filed Sep. 9, 2015, claiming benefit of priority to European Patent Application No. 14187337.2, filed Oct. 1, 2014, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to low density polyethylene and its use in applications involving elongational hardening of the polymer melt.

BACKGROUND OF THE INVENTION

Low density polyethylene (LDPE) can be produced by high pressure polymerization in the presence of radical initiating agents. Two basic high pressure polymerization processes for the manufacture of LDPE are autoclave and tubular.

The autoclave reactor process can produce LDPE ("autoclave LDPE") having a high concentration of long chain branches and a relatively broad molecular weight distribution. It is believed that the high concentration of long chain branches results in high values of elongational hardening while the broad molecular weight distribution renders the polymer easy to process.

Unfortunately, the autoclave process can be carried out in the presence of organic peroxides as the radical initiating agents. The organoleptic properties such as odor of LDPE are harmed in the presence of the degradation products of organic peroxides.

The tubular reactor process can produce LDPE ("tubular LDPE") having better organoleptic properties because the tubular process does not require the use of organic peroxides. As such, the tubular process avoids producing the degradation products of organic peroxides. (The tubular process can be carried out by using oxygen alone as the radical initiating agent.)

Unfortunately, the tubular LDPE has a lower concentration of long chain branches and a narrower molecular weight distribution than the corresponding autoclave LDPE. The tubular LDPE is less useful for applications requiring high processability, such as extrusion coating.

There is a need to obtain a LDPE product having high elongational hardening and broad molecular weight distribution, without using organic peroxides.

There is also a need to maintain the density of the LDPE product.

BRIEF SUMMARY OF THE INVENTION

The present disclosure provides a low density polyethylene (LDPE) having:
A) a density from about 0.910 to about 0.924 g/cm$^3$, determined according to ISO 1183 at 23° C.;
B) an elongational hardening of at least about 4.2, at 150° C. at an elongational rate of 1 s$^{-1}$;
C) a ratio Mw/Mn of at least about 18, where
  (i) Mw is the weight average molar mass, measured by a MALLS detector coupled to a GPC, and
  (ii) Mn is the number average molar mass, measured by GPC (Gel Permeation Chromatography); and
D) a Mw of at least about 230,000 g/mol.

The present disclosure provides an article of manufacture made from or containing (A) a substrate and (B) a coating layer made from or containing the disclosed LDPE.

The present disclosure further provides a polymerization process for making the disclosed LDPE, wherein the process occurs (A) in the presence of oxygen as the only radical initiating agent and (B) in the absence of solvents.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

DETAILED DESCRIPTION OF THE INVENTION

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "α-olefin" or "alpha-olefin" means an olefin of formula $CH_2\!=\!CH\!-\!R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "copolymer" means polymers containing more than one kind of comonomers. An example of a copolymer is a terpolymer.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "homopolymer" as used herein is consistent with its ordinary meaning. To the extent that a homopolymer can contain one or more monomeric units, the incorporation of any additional monomeric units has no measurable effect on the polymer's primary, secondary or tertiary structure or no effect on the polymer's physical or chemical properties. In other words, there is no measurable difference between a polymer comprising 100 weight percent of a first monomeric unit, and a co-polymer that includes more than one monomeric units.

In the present description, the term "long chain branching" refers to the polymer characteristic that can be measured by a gel permeation chromatography branching index, gpcBR. The gpcBR is calculated from the bulk light scattering (LS) weight average molecular weight, bulk intrinsic viscosity, and their linear equivalents from GPC calculations. The value of gpcBR is given by:

$$gpcBR = \left(\frac{M_{w,b}}{M_{w,L}}\right)^\alpha \times \left(\frac{[\eta]_L}{[\eta]_b}\right) - 1$$

where $M_{w,b}$ is the bulk weight average molecular weight, as quantified by the Multi-angle-laser-light-scattering (MALLS), $M_{w,L}$ is the weight average molecular weight calculated from the concentration detector for a GPC curve assuming a linear polymer structure, $[\eta]_b$ is the bulk intrinsic viscosity measured in this case by a capillary viscometer (LAUDA), and $[\eta]_L$ is the intrinsic viscosity calculated from the concentration detector GPC curve assuming a linear polymer structure. For more details about theoretical aspects of gpcBR index, see C. Enos, K. Rufener, J. Merrick-Mack, and W. Yau, *Waters International GPC Symposium Proceedings*, Jun. 6-12, 2003, Baltimore, Md., which is incorporated herein by reference in its entirety.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, the term "polymer" means a macromolecular compound prepared by polymerizing monomers of the same or different type. The term "polymer" includes homopolymers, copolymers, terpolymers, interpolymers, and so on.

In a general embodiment, the present disclosure provides a low density polyethylene (LDPE) having:

A) a density from about 0.910 to about 0.924 g/cm$^3$, determined according to ISO 1183 at 23° C.;
B) an elongational hardening of at least about 4.2, at 150° C. at an elongational rate of 1 s$^{-1}$;
C) a ratio Mw/Mn of at least about 18, where
  (i) Mw is the weight average molar mass, measured by a MALLS detector coupled to a GPC, and
  (ii) Mn is the number average molar mass, measured by GPC (Gel Permeation Chromatography); and
D) a Mw of at least about 230,000 g/mol.

In some embodiments, the LDPE is selected from the group consisting of ethylene homopolymers, ethylene copolymers, and mixtures thereof.

In other embodiments, the LDPE is a copolymer selected from the group consisting of ethylene-vinyl acetate copolymers, ethylene-vinyl alcohol copolymers, ethylene-acrylate copolymers, ethylene-methacrylate copolymers, ethylene-α-olefin copolymers and mixtures thereof.

In some embodiments, the density is in the range from about 0.910 to about 0.921 g/cm$^3$. In other embodiments, the density is 0.910, 0.911, 0.912, 0.913, 0.914, 0.915, 0.916, 0.917, 0.918, 0.919, 0.920, 0.921, or an intermediate value.

In some embodiments, the elongational hardening is in the range from about 4.2 to about 10, at 150° C. at an elongational rate of 1 s$^{-1}$. In other embodiments, the elongational hardening is at least about 4.5. In yet other embodiments, the elongational hardening is in the range from about 4.5 to about 10. In particular embodiments, the elongational hardening is 4.5, 5.0, 5.5, 6.0. 6.5, 7.0, 7.5, 8.0, 8.5, 9.0, 9.5, 10.0, or an intermediate value.

In some embodiments, the elongational hardening is at least about 4.5, at 150° C. at an elongational rate of 5 s$^{-1}$. In other embodiments, the elongational hardening is in the range from about 4.5 to about 8. In particular embodiments, the elongational hardening is 4.5, 5.0, 5.5, 6.0. 6.5, 7.0, 7.5, 8.0, or an intermediate value.

In some embodiments, the ratio Mw/Mn is in the range from about 18 to about 30. In other embodiments, the ratio Mw/Mn is in the range from about 18 to about 25. In particular embodiments, the ratio Mw/Mn is 18, 19, 20, 21, 22, 23, 24, 25, or an intermediate ratio.

In some embodiments, Mw is in the range from about 230,000 to about 400,000 g/mol. In other embodiments, Mw is at least 250,000 g/mol. In yet other embodiments, Mw is in the range from about 250,000 to about 400,000 g/mol. In particular embodiments, Mw is 250,000, 260,000, 270,000, 280,000, 290,000, 300,000, 310,000, 320,000, 330,000, 340,000, 350,000, 360,000, 370,000, 380,000, 390,000, 400,000, or an intermediate value.

In some embodiments, the LDPE has a gpcBR of at least about 1.5. In other embodiments, the gpcBR is in the range from about 1.5 to about 4. In yet other embodiments, the gpcBR is at least about 1.7. In particular embodiments, the gpcBR is in the range from about 1.7 to about 4. In further embodiments, the gpcBR is 1.7, 2.0, 2.5, 3.0, 3.5, 4.0, or an intermediate value.

In some embodiments, the LDPE has a melt flow rate (MFR) according to ISO 1133 (190° C., 2.16 kg) in the range from about 1.5 to about 15 g/10 min. In other embodiments, the melt flow rate is 1.5, 2, 3, 4, 5, 6, 7, 8, 9, 10, 11, 12, 13, 14, 15, or an intermediate value.

In some embodiments, the LDPE can be used in extrusion coating and other applications where high elongational hardening of the polymer melt is helpful. In other embodiments, the LDPE can be used in foam applications.

In some embodiments, the LDPE can be used in high speed extrusion coating processes, with consistent quality.

In a general embodiment, the present disclosure provides an article of manufacture made from or containing
- A) a substrate and
- B) a coating layer made from or containing a low density polyethylene (LDPE) having:
  - (i) a density from about 0.910 to about 0.924 g/cm$^3$, determined according to ISO 1183 at 23° C.;
  - (ii) an elongational hardening of at least about 4.2, at 150° C. at an elongational rate of 1 s$^{-1}$;
  - (iii) a ratio Mw/Mn of at least about 18, where
    - (1) Mw is the weight average molar mass, measured by a MALLS detector coupled to a GPC, and
    - (2) Mn is the number average molar mass, measured by GPC (Gel Permeation Chromatography); and
  - (iv) a Mw of at least about 230,000 g/mol.

In a general embodiment, the present disclosure provides a polymerization process for making a low density polyethylene (LDPE), including a step of free-radical polymerizing reactants, wherein the LDPE has:
- A) a density from about 0.910 to about 0.924 g/cm$^3$, determined according to ISO 1183 at 23° C.;
- B) an elongational hardening of at least about 4.2, at 150° C. at an elongational rate of 1 s$^{-1}$;
- C) a ratio Mw/Mn of at least about 18, where
  - (i) Mw is the weight average molar mass, measured by a MALLS detector coupled to a GPC, and
  - (ii) Mn is the number average molar mass, measured by GPC (Gel Permeation Chromatography); and
- D) a Mw of at least about 230,000 g/mol, wherein the process occurs
- A) in the presence of oxygen as the only radical initiating agent, and
- B) in the absence of solvents.

In some embodiments, the polymerization process occurs in a tubular reactor. For examples of tubular reactor processes, see U.S. Pat. No. 3,691,145 and U.S. Patent Application No. 2010/0076160, which are incorporated by reference herein.

In some embodiments, the reactants include α-olefin comonomers selected from the group consisting of $C_3$-$C_{10}$ α-olefins. In particular embodiments, the $C_3$-$C_{10}$ α-olefins include propylene, 1-butene, 1-hexene, 1-octene and mixtures thereof.

In some embodiments, a gas mixture (hereinafter called "polymerization gas") of ethylene and oxygen is injected into a high pressure tubular reactor. In other embodiments, the oxygen is fed in the form of air. In yet other embodiments, the polymerization gas can include comonomers.

The polymerization gas can also include one or more chain transfer agents. In some embodiments, the chain transfer agent is selected from the group consisting of propylene, propane and propionic aldehyde. In some embodiments, the chain transfer agents are used to regulate the molecular weights.

In some embodiments, the polymerization process includes a step of feeding the polymerization gas to the reactor at a pressure in the range from about 1400 to less than about 1900 bar. In other embodiments, the pressure is in the range from about 1400 to about 1840 bar. In particular embodiments, the pressure is 1400, 1500, 1600, 1700, 1800, 1840, or an intermediate value.

In some embodiments, the step of free-radical polymerizing occurs in a temperature in the range from about 150 to about 320° C. In other embodiments, the polymerization process has a temperature of 150, 160, 170, 180, 190, 200, 210, 220, 230, 240, 250, 260, 270, 280, 290, 300, 310, 320, or an intermediate value.

EXAMPLES

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

The following analytical methods are used to characterize the polymer compositions.

Density: Determined according to ISO 1183 at 23° C.

Elongational Hardening: Elongational hardening is the increase of melt viscosity measured under uniaxial elongation with constant elongational rate (1 s$^{-1}$ and 5 s$^{-1}$) as compared to the steady-state viscosity value, $\eta_{E,max}/\eta_s$. $\eta_{E,max}$, when no plateau is observed after a certain elongation, is defined as the maximum polymer melt viscosity value, under uniaxial elongation with the specific elongational rate at the temperature of 150° C., measured at a time t=3×1/(elongational-rate) after the start of deformation or at elongation L(t)/L(0)≥3 (e.g. for elongational rates of 1 1/s after t=3 sec and for elongational rates of 5 1/s after t=0.6 sec).

The linear viscoelastic response, $\eta s$, is calculated from fitting linear rheological data of G' and G" at the same temperature with a multi-mode Maxwell model, calculating the transient shear viscosity and multiplying by 3 (Trouton ratio). When the measurement is not an ideal uniaxial elongation, the Trouton ratio may be between 3 and 4 with the target being to fit the steady-state elongational viscosity curve at measured elongational rates. The method is described in Mackosko C. W. Rheology Principles, Measurements and Applications, 1994, Wiley-VCH, New York.

The measurements were performed on a rotational rheometer instrument Physica MCR 301 from AntonPaar, equipped with the Sentmanant Elongational Rheology tool (SER). The measurements were performed at 150° C., after an annealing time of 5 min at the measurement temperature. The measurements were repeated for different specimens of each sample at elongational rates varying between 0.01 s$^{-1}$ and 10 s$^{-1}$. The determination of elongational hardening (also called strain hardening) was carried out during uniaxial elongation at a constant elongational rate. For each measurement, the uniaxial elongational melt viscosity was recorded as a function of time.

The test specimens were prepared for the measurement as follows: 2.2 g of the material were weighed and used to fill a molding plate of 70×40×1 mm. The plate was placed in a press and heated up to 200° C., for 1 min, under a pressure of 25 bar. After the temperature of 200° C. was reached, the sample was pressed at 100 bar for 4 min. After the end of the compression-time, the material was cooled to room temperature and plates were removed from the form. From the 1 mm thick compressed polymer plate, rectangular films of 12×11 mm were cut and measured.

Dynamic Head-space gas chromatography (GC)

Samples were thermodesorbed (TDS) using a standard GERSTEL Thermal Desorption Unit TDU at 280° C. for 15 minutes to characterize oligomers, additives, by-products, and volatile components. Stripped organics were separated by capillary GC (HP5-MSUI-Agilent) and identified by using Mass Spectrometer (quadrupole). TDS desorption occurs into Oxygen-free atmosphere. Ultrahigh purity helium (same as carrier for GC-MS) was used. Results obtained in TIC mode (Total Ion Current).

GpcBR and Molecular Weight Distribution Determination

The gpcBR is measured by a gel-permeation chromatography coupled with a multi-angle-laser-light-scattering detector, GPC-MALLS. The bulk intrinsic viscosity, $\eta_b$, is determined in a capillary viscometer (PVS2, LAUDA) in decalin at 135° C., according to the DIN EN ISO 1628-3: 2010-10. The determination of the molar mass distributions and the Mn, Mw and Mw/Mn were carried out by high-temperature gel permeation chromatography using a method described in ISO 16014-1, -2, -4, issues of 2003.

Solvent: 1,2,4-trichlorobenzene (TCB),
temperature of apparatus and solutions: 135° C.
concentration detector: a PolymerChar (Valencia, Paterna 46980, Spain) IR-4 infrared detector for use with TCB
WATERS Alliance 2000 equipped with pre-column SHODEX UT-G and separation columns SHODEX UT 806 M (3×) and SHODEX UT 807 (Showa Denko Europe GmbH, Konrad-Zuse-Platz 4, 81829 Muenchen, Germany), connected in series The solvent was vacuum distilled under nitrogen and stabilized with 0.025% by weight of 2,6-di-tert-butyl-4-methylphenol. The flowrate was 0.6 ml/min. The injection was 500 µl. The polymer concentration was in the range from about 0.01% to about 0.05% w/w.

The molecular weight calibration was established by using monodisperse polystyrene (PS) standards from Polymer Laboratories (now Agilent Technologies, Herrenberger Str. 130, 71034 Boeblingen, Germany) in the range from 580 g/mol up to 11600000 g/mol and additionally with hexadecane. The calibration curve was then adapted to polyethylene (PE) by means of the Universal Calibration method (Benoit H., Rempp P. and Grubisic Z., & in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim, Germany) respectively.

The radius of gyration for each fraction eluted from the GPC (as described above but with a flow-rate of 0.6 ml/min and a column packed with 30 µm particles) was measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software.

Melt Flow Rate: Measured according to ISO 1133 at 190° C. with a load of 2.16 kg.

Example 1

A hyper compressor consisting of two compression strands (an A- and a B-side) was fed with a mixture of ethylene, propylene, propionic aldehyde and air.

For each ton of compressed ethylene, 2.2 kg of propylene, 0.05 kg of propionic aldehyde and 0.13 kg of air were added to the ethylene entering the A-side. The A-side mixture was compressed to a pressure within the range of 1600 to 1800 bar. The compressed mixture was then heated to 180±5° C. and entered at the beginning of a tubular reactor. During the polymerization, the temperature in the reactor rose. Pressurized hot water of 150 to 200° C. was circulated through the jackets surrounding the reactor tubes to keep the maximum reaction temperature below 320° C.

The B-side of the hyper compressor was fed with 2.2 kg of propylene and 0.23 kg of air per ton of ethylene entering the B-side. The ethylene mass flow entering the B-side was half the ethylene mass flow entering the A-side. The ethylene/propylene/air mixture from the B-side, which was compressed to a pressure within the range of 1500 to 1700 bar, entered the tubular reactor at half length of the reactor with a temperature of 80±5° C. Pressurized hot water of 150 to 200° C. was circulated through the jackets surrounding the reactor tubes to keep the maximum reaction temperature below 320° C.

The polymer was discharged and degassed. The molten polymer entered an extruder to form the LDPE pellets.

The tubular LDPE had a density of 0.916 g/cm$^3$, a melt flow rate of 4.6 g/10 min (2.16 kg, 190° C.), a weight average molecular mass Mw(MALLS) of 264000 g/mol, a Mw(MALLS)/Mn value of 23, elongational hardenings at 150° C. of 5.7 at an elongational rate of 1 s$^{-1}$ and 5.8 at 5 s$^{-1}$, and a gpcBR (determined with $\alpha$=0.70) of 2.15.

The head-space GC did not show any signal of isododecane, tert-butyl alcohol, or acetone.

Comparative Example 1

A hyper compressor consisting of two compression strands (an A- and a B-side) was fed with a mixture of ethylene, propionic aldehyde and air.

For each ton of compressed ethylene, 0.75 kg of propionic aldehyde and 0.06 kg of air were added to the ethylene entering the A-side. The A-side mixture was compressed to a pressure within the range of 2100 to 2300 bar. The compressed mixture was heated to 175±5° C. and entered at the beginning of a tubular reactor. During the polymerization, the temperature in the reactor rose. Pressurized hot water of 150 to 200° C. was circulated through the jackets surrounding the reactor tubes to keep the maximum reaction temperature below 320° C.

The B-side of the hyper compressor was fed with 0.3 kg of propionic aldehyde and 0.11 kg of air per ton of ethylene entering the B-side. The ethylene mass flow entering the B-side was half the ethylene mass flow entering the A-side. The ethylene/propionic aldehyde/air mixture from the B-side, which was compressed to a pressure within the range of 1900 to 2200 bar, entered the tubular reactor with a temperature of 60±5° C. Pressurized hot water of 150 to 200° C. was circulated through the jackets surrounding the reactor tubes to keep the maximum reaction temperature below 320° C.

The polymer was discharged and degassed. The molten polymer entered an extruder to form the LDPE pellets.

The tubular LDPE had a density of 0.923 g/cm$^3$, a melt flow rate of 4.2 g/10 min (2.16 kg, 190° C.), a weight average molecular mass Mw(MALLS) of 131,000 g/mol, a Mw(MALLS)/Mn value of 6.8, elongational hardenings at 150° C. of 3.6 at an elongational rate of 1 s$^{-1}$ and 4.0 at 5 s$^{-1}$, and a gpcBR (determined with $\alpha$=0.70) of 0.88.

Comparative Example 2

A hyper compressor was fed with a mixture of ethylene and propane.

For each ton of compressed ethylene, 2.4 kg of propane was added to the ethylene entering the compressor. The mixture was compressed to a pressure within the range of 1600 to 1800 bar. The compressed mixture was cooled to 27° C. and fed to a stirred autoclave reactor.

A mixture of TBPEH (tert-butyl peroxy-2-ethylhexanoate) and TBPA (tert-butyl peroxyacetate) dissolved in isododecane was prepared, wherein 28% of the weight of the mixture was made from or contained TBPEH, 36% of the weight of the mixture was made from or contained TBPA, and 36% of the weight of the mixture was made from or contained isododecane. The mixture was fed to the reactor such that the average reactor temperature was 240° C.

The polymer was discharged and degassed. The molten polymer entered an extruder to form the LDPE pellets.

The autoclave LDPE had a density of 0.926 g/cm$^3$, a melt flow rate of 5.7 g/10 min (2.16 kg, 190° C.), a weight average molecular mass Mw(MALLS) of 367,000 g/mol, a Mw(MALLS)/Mn value of 21, and elongational hardenings at 150° C. of 6.7 at an elongational rate of 1 s$^{-1}$ and 6.3 at 5 s$^{-1}$, and a gpcBR (determined with α=0.70) of 2.30.

Head-space GC showed the signal of isododecane.

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A low density polyethylene comprising:
   A) a density from about 0.910 to about 0.924 g/cm$^3$, determined according to ISO 1183 at 23° C.;
   B) an elongational hardening of at least about 4.2, at 150° C. at an elongational rate of 1 s$^{-1}$;
   C) a ratio Mw/Mn of at least about 18, where
      (i) Mw is the weight average molar mass, measured by a MALLS detector coupled to a GPC, and
      (ii) Mn is the number average molar mass, measured by GPC (Gel Permeation Chromatography); and
   D) Mw from about 230,000 g/mol to about 400,000 g/mol.

2. The low density polyethylene of claim 1, wherein the low density polyethylene is selected from the group consisting of ethylene homopolymers, ethylene copolymers and mixtures thereof.

3. The low density polyethylene of claim 1, wherein the low density polyethylene has an elongational hardening of at least about 4.5, at 150° C. at an elongational rate of 5 s$^{-1}$.

4. The low density polyethylene of claim 1, wherein the low density polyethylene has a gpcBR value of at least about 1.5.

5. The low density polyethylene of claim 1, wherein the low density polyethylene has a melt flow rate (MFR) according to ISO 1133 (190° C., 2.16 kg) from about 1.5 to about 15 g/10 min.

6. An article of manufacture comprising:
   A) a substrate, and
   B) a coating layer, wherein the coating layer comprises a low density polyethylene (LDPE) and wherein the LDPE has:
      (i) a density from about 0.910 to about 0.924 g/cm$^3$, determined according to ISO 1183 at 23° C.;
      (ii) an elongation hardening of at least about 4.2, at 150° C. at an elongational rate of 1 s$^{-1}$;
      (iii) a ratio Mw/Mn of at least 18, wherein
         (1) Mw is the weight average molar mass, measured by a MALLS detector coupled to a GPC, and
         (2) Mn is the number average molar mass, measured by GPC (Gel Permeation Chromatography); and
      (i) Mw from about 230,000 g/mol to about 400,000 g/mol.

7. A polymerization process for making a low density polyethylene (LDPE) comprising:
   A) a step of free radical polymerizing reactants, wherein the LDPE comprises
      (i) a density from about 0.910 to about 0.924 g/cm$^3$, determined according to ISO 1183 at 23° C.;
      (ii) an elongational hardening of at least about 4.2, at 150° C. at an elongational rate of 1 s$^{-1}$;
      (iii) a ratio Mw/Mn of at least about 18, wherein
         (1) Mw is the weight average molar mass, measured by a MALLS detector coupled to a GPC,
         (2) Mn is the number average molar mass, measured by GPC (Gel Permeation Chromatography), and
      (iv) Mw from about 230,000 g/mol to about 400,000 g/mol
   wherein the process occurs
   A) in the presence of oxygen as the only radical initiating agent, and
   B) in the absence of a solvent.

8. The polymerization process of claim 7, wherein the step of free-radical polymerizing reactants occurs in a tubular reactor.

9. The polymerization process of claim 7, further comprises a step of feeding a polymerization gas to the reactor at a pressure from about 1400 to less than about 1900 bar.

10. The polymerization process of claim 7, where in the step of free-radical polymerizing occurs in a temperature range of from about 150 to about 320° C.

* * * * *

UNITED STATES PATENT AND TRADEMARK OFFICE
CERTIFICATE OF CORRECTION

PATENT NO. : 10,364,306 B2
APPLICATION NO. : 15/514788
DATED : July 30, 2019
INVENTOR(S) : Weiand et al.

Page 1 of 1

It is certified that error appears in the above-identified patent and that said Letters Patent is hereby corrected as shown below:

In the Specification

In Column 4, Line 29, delete "6.0." and insert -- 6.0, --
In Column 4, Line 35, delete "6.0." and insert -- 6.0, --
In Column 7, Line 22, after "series" insert -- . --
In Column 7, Line 25, delete "flowrate" and insert -- flow rate --
In Column 7, Line 48, delete "120mW" and insert -- "120Mw" --

In the Claims

In Column 10, Claim 10, Line 51, delete "where in" and insert -- wherein --

Signed and Sealed this
Twenty-eighth Day of June, 2022

Katherine Kelly Vidal
*Director of the United States Patent and Trademark Office*